3,013,948
Patented Dec. 19, 1961

3,013,948
MICROBIAL SYNTHESIS OF PHYSIOLOGICALLY ACTIVE VITAMIN $B_{12}$ SUBSTANCES USING PRECURSORS
Harrison A. Hoffmann, Webster Groves, William A. Hardwick, University City, and Robert D. Seeley, Webster Groves, Mo., assignors to Anheuser-Busch, Incorporated, St. Louis, Mo., a corporation of Missouri
No Drawing. Filed Apr. 27, 1956, Ser. No. 580,982
10 Claims. (Cl. 195—114)

The present invention relates generally to the commercial production of physiologically active vitamin $B_{12}$ substances by microbial synthesis, and more particularly to the production of these substances using microorganisms of the genus Propionibacterium under anaerobic conditions with selected precursors and preferred nutrient media.

In order to simplify the language which is used hereinafter, it is to be understood that when the term "physiologically active substances" is used, it includes the so-called true vitamin $B_{12}$ and the vitamin $B_{12}$ analogues which are characterized by their growth-promoting properties for animals and for the microorganisms *Lactobacillus leichmannii, Ochromonas malmahensis,* and *Escherichia coli* (Davis strain).

Most, if not all, of the known fermentation processes for producing physiologically active vitamin $B_{12}$ substances are aerobic. This type of fermentation process has the following-listed disadvantages:

(1) Foaming problems have to be overcome as by using a larger fermentor or special anti-foaming agent.
(2) It is necessary to sterilize the air.
(4) There is a considerably greater danger from contamination.
(4) It requires additional equipment inasmuch as many fermentors are not equipped for aerating the fermentation medium.

It is an object of the present invention, therefore, to provide a novel process for producing physiologically active vitamin $B_{12}$ substances under anaerobic condition. More particularly, it is an object to provide an anaerobic fermentation process employing microorganisms of the genus Propionibacterium for producing either so-called true vitamin $B_{12}$ and/or one or more of its physiologically active analogues.

Briefly, the invention comprises the use of specially selected precursors which are contained in the fermentation medium so as to synthesize physiologically active vitamin $B_{12}$ substances using microorganisms of the genus Propionibacterium in an anaerobic fermentation process.

We have now discovered that when the aforementioned organisms are propagated under anaerobic conditions and certain specific precursors are in the nutrient medium, the Propionibacterium microorganisms synthesize physiologically active vitamin $B_{12}$ substances, and when no precursors are added to the nutrient medium and none are contained in it, so-called Factor B, which is the prophyrin-like moiety of true vitamin $B_{12}$, is produced.

Thus, it is indicated that during the initial investigation when physiologically active substances were produced under anaerobic conditions without the addition of special precursor material, the nutrient medium itself contained the necessary components to synthesize the complete vitamin $B_{12}$ molecule or one of its physiologically active analogues.

When special precursors are used, the vitamin $B_{12}$ molecule or the vitamin $B_{12}$ analogue which is synthesized in each case, corresponds to the nature of the precursor which is contained in the medium. The main point is that the precursor, whether initially present in the medium or added thereto, must provide the benzimidazole or ortho-diamino benzene moiety which is assimilated or utilized by the organism in the production of vitamin $B_{12}$ or its physiologically active analogue.

Of the many precursors which have been tested, the following-listed precursors which have produced vitamin $B_{12}$ and vitamin $B_{12}$ analogues which are active for the test organism *L. leichmannii, Ochromonas malmahensis,* and the chick:

(a) Ortho phenylene diamine
(b) 1:2, dimethyl-4,5, diaminobenzene
(c) Benzimidazole
(d) 5:6, dimethyl benzimidazole The use of 1:2, dimethyl-4:5, diaminobenzene and 5:6, dimethyl benzimidazole resulted in the synthesis of true vitamin $B_{12}$, whereas the other two precursors caused the production of physiologically active analogues of vitamin $B_{12}$.

Set forth below is a table which shows the results of using the aforementioned precursors in selected amounts in non-aerated flask fermentations of a selected strain of *Propionibacterium shermanii* (PS–B1) in a nutrient medium comprising 4% corn steep liquor solids and 2% DE molasses.

The precursors were added to 200 ml. of this basal medium in the ranges shown in the table, the pH was adjusted to 7.5 with ammonium hydroxide and then sterilized by heating to 121° C. for 30 minutes. Following sterilization, the inoculum was added at 5% by volume, and the flasks were incubated at 30° C. for 48 hours.

In several instances, in order to make certain that the physiologically active vitamin $B_{12}$ substances were produced under anaerobic conditions, all air was swept away with nitrogen gas.

| Precursor | Concentration, p.p.m. | $\mu$g. $B_{12}$/ml. by *L. leichmannii* assay |
|---|---|---|
| None | | 0.30 |
| o-phenylene diamine | 5 | 0.37 |
| Do | 10 | 0.45 |
| Do | 20 | 0.77 |
| 1:2, dimethyl-4:5, diaminobenzene | 1.25 | 0.63 |
| Do | 2.5 | 0.60 |
| Do | 5 | 0.70 |
| Do | 10 | 0.82 |
| Do | 25 | 1.36 |
| Do | 50 | 1.64 |
| Do | 100 | 1.59 |
| Do | 200 | 1.53 |
| Benzimidazole | 5 | 0.65 |
| Do | 10 | 0.89 |
| Do | 20 | 1.34 |
| 5:6, dimethyl benzimidazole | 0.1 | 1.63 |
| Do | 0.5 | 1.71 |
| Do | 1.0 | 1.54 |
| Do | 5.0 | 1.66 |
| Do | 10.0 | 1.39 |
| Do | 50 | 1.47 |
| Do | 100 | 1.40 |

Examination of the results in the foregoing table shows that the addition of precursors increases the yield of physiologically active $B_{12}$ compounds 3 to 6 fold over the control fermentation with no precursor added. The results in the foregoing table also shows that some precursors are more readily utilized than others by Propionibacterium. Thus, each precursor has its optimum range for producing maximum yields of vitamin $B_{12}$ activity.

Other species of Propionibacterium such as *P. freudenreichii, P. zeae* and *P. technicum* when grown with no aeration in the molasses-corn steep liquor medium previously described show a smaller but still significant increase in the yields of vitamin $B_{12}$ when natural precursors of vitamin $B_{12}$ are added to the medium.

The comparative values of vitamin $B_{12}$ yields in 48 hour fermentation broths with and without precursor are shown for these respective species in the following table:

| Precursor | P.p.m. | μg. B₁₂/ml. of Broth by L. leichmannii Assay | | |
|---|---|---|---|---|
| | | P. freudenreichii | P. zeae | P. technicum |
| None | | 0.20 | 0.28 | 0.32 |
| 5:6, dimethyl benzimidazole | 3 | 0.45 | 0.37 | 0.41 |
| Do | 6 | 0.44 | 0.37 | 0.43 |
| Do | 12 | 0.46 | 0.34 | 0.39 |
| 1:2, dimethyl-4:5, diaminobenzene | 10 | 0.25 | 0.23 | 0.29 |
| Do | 30 | 0.32 | 0.24 | 0.26 |
| Do | 60 | 0.38 | 0.36 | 0.36 |

As occurs with *P. shermanii*, the precursor with the preformed benzimidazole ring is more active than the benzene moiety, with the other species of Propionibacterium.

The physiologically active $B_{12}$ compounds synthesized by *Propionibacterium shermanii* with each precursor were isolated and purified by column and paper chromatography, subsequently hydrolyzed, and the benzimidazole moiety identified by paper chromatography and U.V. absorption spectrographic methods.

These analyses show that with the precursors ortho phenylene diamine and benzimidazole, the vitamin $B_{12}$ compound formed is an analogue of true vitamin $B_{12}$, which has no methyl groups on the 5 and 6 positions of the benzimidazole. The precursors 1:2, dimethyl-4:5, diaminobenzene and 5:6, dimethyl benzimidazole, produce true vitamin $B_{12}$.

These precursors are effective in producing higher yields of vitamin $B_{12}$ only in non-aerated fermentations. The addition of such precursors to aerated fermentations lowers the vitamin $B_{12}$ yield below that which would normally be attained in the aerated fermentation. For example, aerated flask fermentations using 4% corn steep liquor and 2% DE hydrolyzed molasses as a medium gave the following average values of vitamin $B_{12}$ with and without added dimethyl benzimidazole.

| P.p.m. dimethyl benzimidazole | μg. B₁₂/ml. by L. leichmannii assay |
|---|---|
| 5 | 0.76 |
| 0 | 1.2 |

Set out below are illustrative examples of methods for producing physiologically active vitamin $B_{12}$ substances in accordance with the teachings of the present invention. It is to be understood, however, that these are given only by way of illustration and not by way of limitation.

*Example 1*

Ten liters of a mixture of water and molasses of 4% dextrose equivalent was adjusted to pH 3.5 with dilute sulfuric acid and sterilized by heating to 121° C. for 1 hour. Ten liters of a mixture of corn steep liquor and water containing 8% corn steep liquor solids was adjusted to pH 7.5 with ammonium hydroxide and sterilized by heating to 121° C. for one hour. The quantities of corn steep liquor and molasses were then aseptically mixed in a fermentor, dimethyl benzimidazole added to 5 p.p.m., the mixture adjusted to pH 6.5 with ammonium hydroxide, and then inoculated with 10% by volume of a culture of *Propionibacterium shermanii* (selected strain PS–B1).

The fermentor was held for 40 hours at 30° C. without aeration and the cells were harvested by centrifuging and drying. The yield of dried product was 143 grams, containing 25.2 mg. of vitamin $B_{12}$ as assayed by *L. leichmannii*.

*Example 2*

Twenty liters of a nutrient medium comprising 4% corn steep liquor solids, 2% dextrose, 10 p.p.m. cobaltous chloride, 30 p.p.m. ortho phenylene diamine, and ammonium hydroxide to adjust to pH 7.5 were sterilized in a 10 gallon stainless steel pressure fermentor at 121° C. for 1 hour. One liter of a selected culture of *Propionibacterium shermanii* (strain PS–B1) grown on a similar medium but without ortho phenylene diamine, was transferred aseptically to the 10 gallon fermentor.

This fermentation was allowed to run without agitation or aeration at 30° C. for 56 hours. At the end of this time, the broth assayed at 1.42 micrograms of vitamin $B_{12}$ activity per ml. Centrifuged cells dried on a drum drier yielded 112 gms. of solids assaying 226 micrograms of vitamin $B_{12}$ activity per gram.

*Example 3*

A nutrient medium and procedure similar to that described in Example 2 above was used except that 48 p.p.m. of 1:2,-dimethyl-4:5-diamino benzene hydrochloride was added to the fermentor as a precursor.

This fermentation was inoculated with 5% by volume of a culture of *Propionibacterium shermanii* (selected strain PS–B1) and held at 30° C. without aeration for 40 hours. Assay of the 40 hour broth by *L. leichmannii* showed 0.9 microgram of vitamin $B_{12}$ activity per milliliter.

*Example 4*

Two hundred milliliters of a nutrient medium comprising 4% corn steep liquor solids, 2% dextrose equivalent of hydrolyzed molasses, 10 p.p.m. benzimidazole, and ammonium hydroxide to adjust to pH 7.5 was sterilized in a flask by autoclaving at 121° C. for 30 minutes. This medium was then inoculated with 10% by volume of a culture of *Propionibacterium shermanii* (selected strain PS–B1) and incubated without agitation or stirring for 44 hours at 30° C.

This broth showed a vitamin $B_{12}$ activity of 1.2 micrograms per milliliter by *L. leichmannii* assay.

Thus, it is apparent that there has been provided a novel anaerobic process for producing physiologically active vitamin $B_{12}$ substances using selected strains of microorganism of the genus Propionibacterium.

Either true vitamin $B_{12}$ or its physiologically active analogues can be synthesized, depending upon the particular precursor which is contained in the nutrient medium.

Because the process is carried on under anaerobic conditions, there are no foaming problems to overcome and the fermentation tank can be used to its greatest capacity. Also, the expense of operating the process is maintained at a minimum because it is not necessary to install or operate aeration equipment, and it is not necessary to provide large quantities of sterile air. In addition, because no air is used, there is less danger of contamination.

It is to be understood that the foregoing description and examples have been given only by way of illustration, and that changes and alterations in the present disclosure, which will be readily apparent to one skilled in the art, are contemplated as within the scope of the present invention, which is limited only by the claims which follow.

What is claimed is:

1. A process for the production of not less than about 1500 micrograms per liter of physiologically active vitamin $B_{12}$ substances including the steps of culturing bacteria of the genus Propionibacterium in fermentations without aeration and without agitation in a nutrient medium containing a vitamin $B_{12}$-nucleotide precursor, and recovering not less than about 1500 micrograms of vitamin $B_{12}$ substances per liter.

2. A process for the production of not less than about 1500 micrograms per liter of physiologically active vitamin $B_{12}$ substances including the steps of culturing bacteria of the genus Propionibacterium in fermentations without aeration and without agitation in a nutrient medium containing precursor selected from the group consisting of ortho phenylene diamine; 1:2 dimethyl-4:5 diaminobenzene: benzimidazole; and 5:6 dimethyl benzimidazole, and recovering not less than about 1500 micrograms of vitamin $B_{12}$ substances per liter.

3. A process for the production of not less than about 1500 micrograms per liter of physiologically active vitamin $B_{12}$ substances including the steps of culturing bacteria of the genus Propionibacterium in non-aerated fermentations in a nutrient medium containing ortho phenylene diamine, and recovering not less than about 1500 micrograms of substantially pure vitamin $B_{12}$ substances per liter.

4. A process for the production of not less than about 1500 micrograms per liter of physiologically active vitamin $B_{12}$ substances including the steps of culturing bacteria of the genus Propionibacterium in non-aerated fermentations in a nutrient medium containing 1:2 dimethyl-4:5 diaminobenzene, and recovering not less than about 1500 micrograms of substantially pure vitamin $B_{12}$ substances per liter.

5. A process for the production of not less than about 1500 micrograms per liter of physiologically active vitamin $B_{12}$ substances including the steps of culturing bacteria of the genus Propionibacterium in non-aerated fermentations in a nutrient medium containing benzimidazole and recovering not less than about 1500 micrograms of substantially pure vitamin $B_{12}$ substances per liter.

6. A process for the production of not less than about 1500 micrograms per liter of physiologically active vitamin $B_{12}$ substances including the step of culturing bacteria of the genus Propionibacterium in non-aerated fermentations in a nutrient medium containing 5:6 dimethyl benzimidazole, and recovering not less than about 1500 micrograms of substantially pure vitamin $B_{12}$ substances per liter.

7. A process for the production of selected physiologically active vitamin $B_{12}$ substances, including the steps of selecting a Factor B producing bacterium of the genus Propionibacterium which cannot synthesize the vitamin $B_{12}$ nucleotide base under non-oxygenated conditions but which will conjugate Factor B with a supplied vitamin $B_{12}$ nucleotide base and cultivating said organism under non-oxygenated conditions in a nutrient medium containing a vitamin $B_{12}$ nucleotide precursor selected from the group consisting of ortho phenylene diamine; 1:2 dimethyl-4:5, diaminobenzene; benzimidazole; and 5:6 dimethyl benzimidazole.

8. A process for the production of selected physiologically active vitamin $B_{12}$ substances, including the steps of selecting a Factor B producing bacterium, which cannot synthesize the vitamin $B_{12}$ nucleotide base under non-aerated conditions but which will conjugate Factor B with a supplied vitamin $B_{12}$ nucleotide base, selected from the group consisting of *P. shermanii, P. freudenreichii, P. zeae,* and *P. technicum,* and cultivating said organism under non-aerated conditions in a nutrient medium containing a vitamin $B_{12}$ nucleotide precursor selected from the group consisting of ortho phenylene diamine; 1:2 dimethyl-4:5, diaminobenzene; benzimidazole; and 5:6 dimethyl benzimidazole.

9. A process for the production of not less than about 1500 micrograms per liter of physiologically active vitamin $B_{12}$ substances including the steps of culturing bacteria of the genus Propionibacterium in fermentations without aeration and without agitation in a nutrient medium containing vitamin $B_{12}$ nucleotide precursor, said fermentations producing less than 300 micrograms vitamin $B_{12}$ per liter in the absence of precursor and recovering more than about 1500 micrograms vitamin $B_{12}$ per liter from the fermentations containing precursor.

10. A process for the production of vitamin $B_{12}$ substances including the steps of culturing bacteria of the genus Propionibacterium in fermentations under conditions wherein said Propionibacterium normally produce substantial pure Factor B and less than about 300 micrograms per liter of vitamin $B_{12}$, said fermentations being conducted in a culture medium containing vitamin $B_{12}$ nucleotide precursor selected from the group consisting of ortho phenylene diamine; 1:2 dimethyl-4:5 diaminobenzene; benzimidazole; and 5:6 dimethyl benzimidazole, and recovering not less than about 1500 micrograms of vitamin $B_{12}$ substances per liter.

References Cited in the file of this patent

UNITED STATES PATENTS

| | | |
|---|---|---|
| 2,715,602 | Hargrove et al. | Aug. 16, 1955 |
| 2,893,988 | Bernhauer et al. | July 7, 1959 |

OTHER REFERENCES

Gergey's Manual of Determinative Bacteriology, 6th ed., 1948, Williams and Wilkins Co., Baltimore, p. 447.

Bernhauer: Angewandte Chemie, vol. 66, Dec. 21, 1954, article pp. 776–780 and pp. 779–780.

Fantes et al.: Biochem. Jour., vol. 59, No. 1, January 1955, pp. 79–82.